United States Patent [19]
Goldberg

[11] Patent Number: 5,596,656
[45] Date of Patent: Jan. 21, 1997

[54] UNISTROKES FOR COMPUTERIZED INTERPRETATION OF HANDWRITING

[75] Inventor: David Goldberg, Palo Alto, Calif.

[73] Assignee: Xerox Corporation, Stamford, Conn.

[21] Appl. No.: 548,416

[22] Filed: Oct. 26, 1995

Related U.S. Application Data

[63] Continuation of Ser. No. 132,401, Oct. 6, 1993, abandoned.

[51] Int. Cl.$^6$ ........................................................ G06K 9/18
[52] U.S. Cl. ......................... 382/186; 382/315; 345/179
[58] Field of Search .................................. 382/185–189, 382/313, 315, 182; 364/705.03, 709.11, 709.01; 345/179, 175, 180–183

[56] References Cited

U.S. PATENT DOCUMENTS

| | | | |
|---|---|---|---|
| 3,199,078 | 8/1965 | Gaffney, Jr., et al. | 340/146.3 |
| 3,835,453 | 9/1974 | Narayanan | 340/146.3 |
| 3,996,557 | 12/1976 | Donahey | 340/146.3 |
| 4,241,409 | 12/1980 | Nolf | 364/705 |
| 4,561,105 | 12/1985 | Crane et al. | 382/13 |
| 4,985,929 | 1/1991 | Tsuyama | 382/13 |
| 5,022,086 | 6/1991 | Crane et al. | 382/2 |
| 5,140,645 | 8/1992 | Whitaker | 382/11 |
| 5,194,852 | 3/1993 | More et al. | 345/182 |
| 5,313,527 | 5/1994 | Guberman et al. | 382/13 |

OTHER PUBLICATIONS

"PenPut™–Beyond character recognition!" Organek™ Technology. Organek™ Standards copyright 1992 and 1993. Patent Pending.

*Primary Examiner*—Michael T. Razavi
*Assistant Examiner*—Larry J. Prikockis

[57] ABSTRACT

To relax the graphical constraints on the precision of the handwriting that is required for accurate computerized interpretation of handwritten text, the text that is to be interpreted is written in accordance with this invention using symbols that are exceptionally well separated from each other graphically. These symbols preferably define an orthographic alphabet to reduce the time and effort that is required to learn to write text with them at an acceptably high rate. Furthermore, to accommodate "eyes-free" writing of text and the writing of text in spatially constrained text entry fields, the symbols advantageously are defined by unistrokes (as used herein, a "unistroke" is a single, unbroken stroke).

16 Claims, 3 Drawing Sheets

UNISTROKES FOR COMPUTERIZED INTERPRETATION OF HANDWRITING

This is a continuation of application Ser. No. 08/132,401, filed Oct. 6, 1993 now abandoned.

FIELD OF THE INVENTION

This invention relates to systems for interpreting handwritten text and, more particularly, to computerized interpreted text entry systems that are especially well-suited for "eyes-free" (e.g., "heads-up") applications and for other applications where it is inconvenient or impractical to spatially distinguish between successive, manually entered alphanumeric characters. Another aspect of this invention relates to relaxing the constraints on the graphical precision of the handwriting that is required for accurate computerized recognition of handwritten text.

BACKGROUND OF THE INVENTION

The keyboard has been the input device of choice for entering text and other alphanumeric data (collectively referred to herein as "text") into most computer systems. Experts use "touch-typing" techniques to enter text at relatively high rates, while novices often employ "hunt and peck" techniques to perform the text entry function at more modest rates.

Modern computers permit of many different form factors, some of which are not particularly well matched to the use of a keyboard for text entry purposes. For example, there are very small "pocket size" and even smaller personal computers, as well as computers that have very large (e.g., wall size) user interfaces to facilitate collaborative interaction. In these miniaturized and very large scale computer systems, the keyboard commonly is supplemented or even replaced by an alternative text entry mechanism, such a stylus or similar pointing device, that can be manually manipulated by the user to "handwrite" graphical symbols that represent the desired text, together with an appropriately programmed processor for translating the handwritten symbols into corresponding alphanumeric computer codes.

The challenge, of course, for these interpreted text entry systems is to accurately interpret the handwritten symbols in the face of the graphical variations that may exist among different instances of most any handwritten symbol when each of the instances is written by a different user or even when all of the instances are written by the same user. High speed and/or "eyes free" handwriting tend to make it even more difficult to meet this challenge because they generally detract from the graphical precision with which the symbols are written (i.e., they usually increase the "sloppiness" of the handwriting).

Clearly, the characters of ordinary Roman alphabets are not reliably distinguishable from each other in the face of rapid or otherwise sloppy writing. For example, many pairs of letters in the English alphabet (such as "r" and "v," "a" and "d," "N" and "W," and "g" and "q") tend to blur together when they are written quickly, without paying close attention to their subtle graphical distinctions. Accordingly, it will be evident that the performance of interpreted text entry systems could be improved if all text was entered using characters that are well separated from each other in "sloppiness space."

This "sloppiness space" notion can best be understood by recognizing that each alphanumeric symbol is defined by some number of features (say, d features). Thus, each symbol nominally resides at a unique point in a d-dimensional space which is referred to herein as "sloppiness space." From this it follows that the amount of overlap, if any, that occurs in the positioning within this d-dimensional space of the normal variants of the symbols of a given alphabet determines how well separated those symbols are in sloppiness space. If there is little, if any, overlap between the variants of different symbols, the symbols are "well separated from each other in sloppiness space."

Ordinary shorthand systems are attractive for interpreted text entry because they can be used to write text at high speed. Unfortunately, however, known shorthand systems use symbols that are at least as difficult to recognize as cursive writing. Nevertheless, it should be noted that there are both orthographic and phonetic shorthand systems for writing text at an atomic level (i.e., the character level in the case of orthographic systems and the phoneme level in the case of phonetic systems). As is known, orthographic systems use conventional spelling and have one symbol for each letter of the native alphabet (e.g., the English alphabet). They, therefore, are relatively easy to learn, but they provide only a modest speedup over ordinary cursive. Phonetic systems (such as the well known Gregg and Pitman systems), on the other hand, employ phonetic spelling, and sometimes use special phonetic alphabets to do so. This makes them more difficult to learn, but it also explains why they generally are preferred when speed is of paramount concern. This indicates that there is a trade off between speed and ease of learning that comes into play when designing a stylus compatible alphabet for interpreted text entry systems.

SUMMARY OF THE INVENTION

To relax the graphical constraints on the precision of the handwriting that is required for accurate computerized interpretation of handwritten text, the text is written in accordance with this invention using symbols that are exceptionally well separated from each other graphically. These symbols preferably define an orthographic alphabet to reduce the time and effort that is required to learn to write text with them at an acceptably high rate. Furthermore, to accommodate "eyes-free" writing of text and the writing of text in spatially constrained text entry fields, the symbols advantageously are defined by unistrokes (as used herein, a "unistroke" is a single, unbroken stroke).

BRIEF DESCRIPTION OF THE DRAWINGS

Still additional features and advantage of this invention will become apparent when the following detailed description is read in conjunction with the attached drawings, in which.

DETAILED DESCRIPTION OF THE PREFERRED EMBODIMENTS

While the invention is described in some detail hereinbelow with reference to certain illustrated embodiments, it is to be understood that it is not limited to those embodiments. On the contrary, the intent is to cover all modifications, alternatives and equivalents falling within the spirit and scope of the invention as defined by the appended claims.

Figure 1:
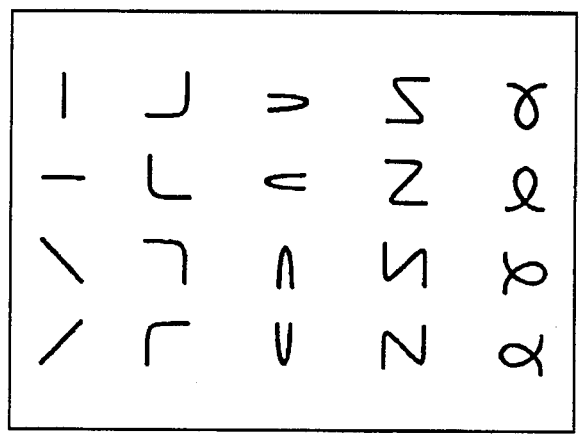
FIG. 1 illustrates the basic strokes of a unistroke alphabet in each of their recommended orientations.
Figure 2:
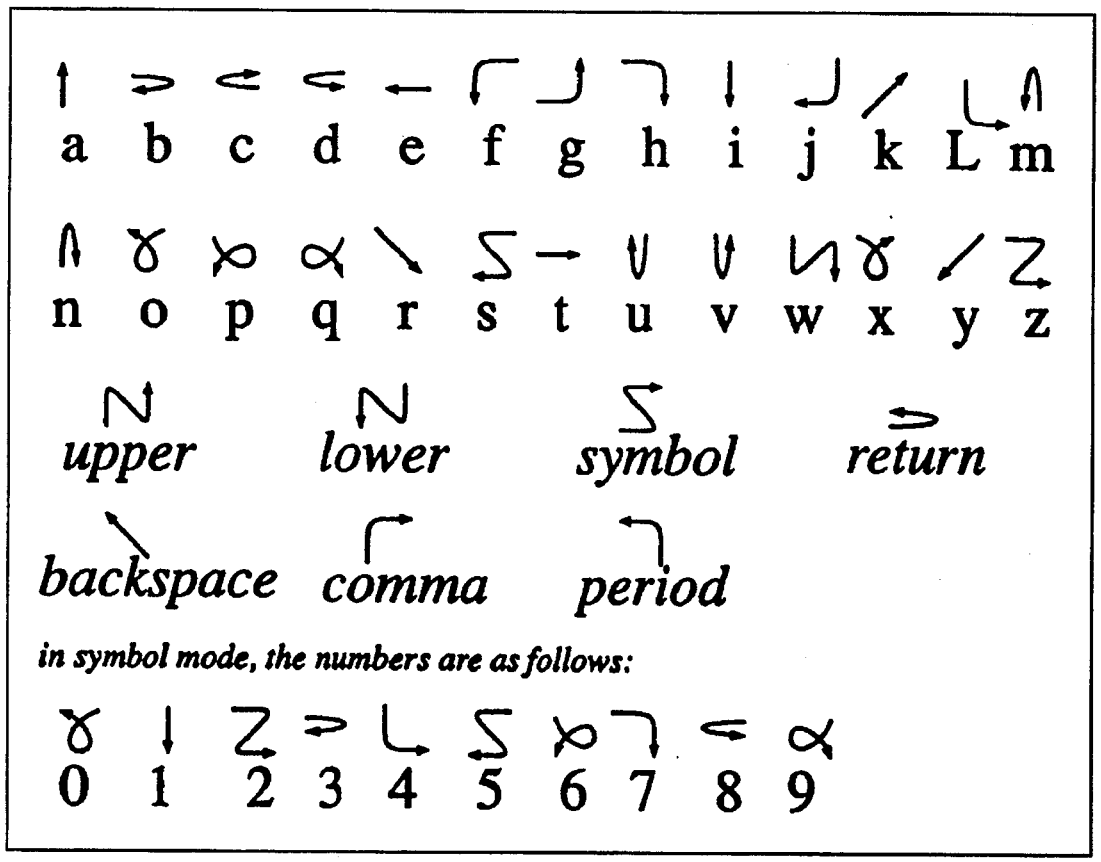
FIG. 2 shows how the symbols of a unistroke alphabet that is based on the strokes and orientations that are shown in FIG. 1, together with a directional parameter, suitably are mapped onto the alphanumeric characters of the English alphabet and some of the more common punction marks and control functions.

Turning now to the drawings, and at this point especially to FIGS. 1 and 2, it will be seen that there is a unistroke alphabet (FIG. 2) that is composed of just five different strokes (FIG. 1) that are written in up to four different rotational orientations (0°, 45°, 90° and 135°) and in one of two opposite directions (stoke direction is more easily captured electronically than in standard mechanical writing systems. This provides 40 unique symbols (5×4×2), which is more than ample to encode the 26 alphabetic characters of, for example, the English alphabet.

Advantageously, the number of different strokes that are used to define the unistroke alphabet is minimized, so that the strokes can be selected to be geometrically well separated from each other in sloppiness space. For the same reason, a substantial angular offset (e.g., at least 45° and preferably 90°) or directional distinction (opposing directions) is provided to distinguish between geometrically like strokes that represent different alphanumeric characters. As a general rule, the symbols of the unistroke alphabet are mapped onto the alphanumeric character set so that the graphical correlation between the two alphabets is as close as possible. In practice, however, some of the geometrically simpler unistrokes, such as the straight line symbols, may be reserved for assignment to the more common alphanumeric characters, such as 'e,' 'a,' 't,' 'i' and 'r,' in the interest of facilitating higher speed text entry.

In keeping with the goal of minimizing the size of the unistroke alphabet, lower and upper case versions of any given alphabetic character are entered in the illustrated embodiment through the use of the same unistroke symbol. To that end, shifts from lower case characters to upper case characters and vice-versa are signaled on a character-by-character basis or on a block basis by entering unistroke symbols that are assigned to the signaling task (see FIG. 2) or by actuating and deactuating a button, such as a button on the barrel of the stylus that is used to write the unistroke symbols (see FIG. 5), to emulate the function of a standard a shift key. Similarly, shifts from a text entry mode to a numeric data entry mode and vice-versa may be signaled on a character-by-character or block basis by entering a unistroke control symbol that is assigned to that task (see FIG. 2) or by operating an appropriate button (if necessary, a multi-click methodology may be used to distinguish between commands that are entered through the operation of any given button, such as the button shown in FIG. 5). When unistroke symbols are used for control functions of the foregoing type, character-by-character commands suitably are signaled by entering the appropriate control symbol just once (i.e., a singlet) while block commands are signaled by entering the control symbol twice (i.e., a doublet).

Figure 3:
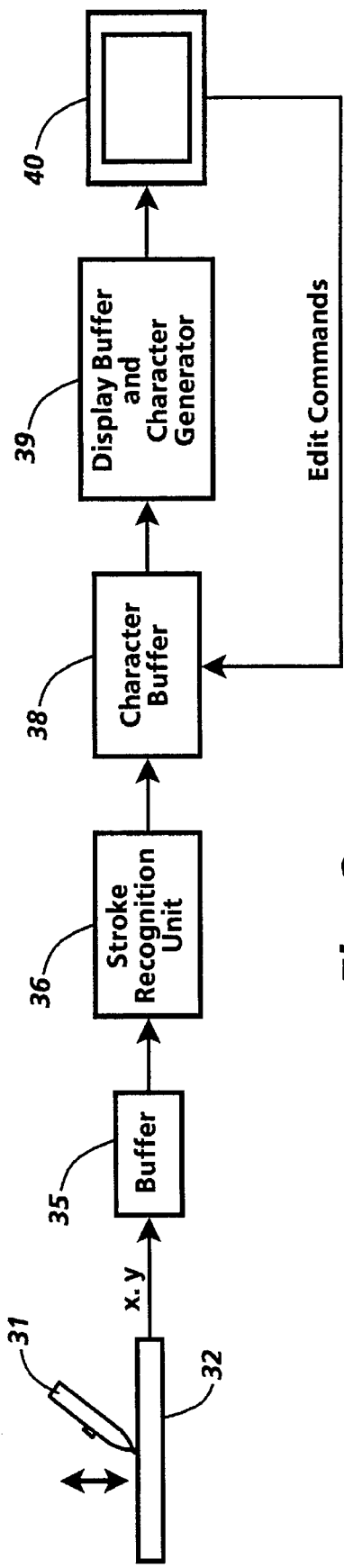
FIG. 3 is a simplified functional block diagram of a system for interpreting text that is handwritten through the use of a stylus or similar pointing device and the unistroke alphabet shown in FIG. 2.
Figure 5:
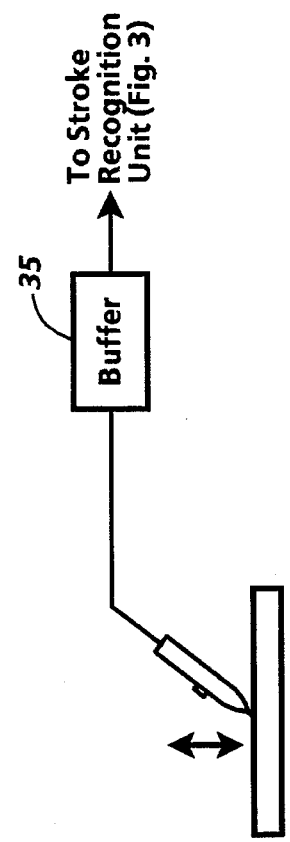
FIG. 5 illustrates an alternative input mechanism for writing unistroke symbols.

In operation, a user typically employs an electronic pen or a stylus 31 (sometimes collectively referred to herein as a "stylus") to handwrite one after another of the unistroke symbols that are needed to formulate an intended text on a suitable writing surface 32. In accordance with the present invention, provision is made (a) for sensing the engagement and disengagement of the stylus 31 with the writing surface 32 at the beginning and end, respectively, of each unistroke symbol, and (b) for converting the geometric path that the stylus 31 traverses while the symbol is being written into a correspondingly ordered sequence of x-y coordinates. To that end, as shown in FIG. 3, an active pressure sensitive writing surface 32 that has a sufficiently fined grained, two dimensional array of position sensors can be employed. Alternatively, as shown in FIG. 5, and active stylus 51 may be employed for performing the engagement/disengagement sensing functions and for converting the motion of the stylus 51 as it is drawn across the writing surface 52 into a corresponding sequence of x-y coordinates. Or, some of those functions (such as the contact sensing) may be performed by the stylus, while others (such as the stylus tracking) are being performed by the writing surface.

In any event, the path the stylus traverses while it is being drawn across the writing surface is converted into an ordered list of x-y coordinates at a sufficiently high spatial sampling frequency to satisfy the Nyquist sampling criterion for all unistroke symbols.

As shown in FIG. 3, the x, y coordinate pairs that describe the path that the stylus 31 traverses while it is being drawn across the writing surface are serially loaded into a buffer 35; starting with the coordinates at which the stylus 31 is engaged with the writing surface 32 and concluding with the coordinates at which the stylus 32 is disengaged therefrom. The buffer 35 is cleared in preparation for each unistroke symbol, such as in response to a state signal indicating that the stylus 31 has been brought into pressure contact with the writing surface 32. Thus, the buffer 35 accumulates an ordered list of x-y coordinate pairs to represent each unistroke symbol that is written.

A recognition unit 36 is triggered when the stylus 31 is disengaged from the writing surface 32 to identify (if possible) the unistroke symbol that best fits the ordered list of x-y coordinates that have been accumulated by the buffer 35 and to read out the corresponding alphanumeric character code from a table lockup memory (not shown). The character code, in turn, is loaded into a character buffer 38 so that it can be edited if desired and then into a display buffer/character generator 39 for writing the corresponding alphanumeric character on a display 40.

The relatively wide separation of the unistroke symbols in sloppiness space reduces the probability of obtaining erroneous or ambiguous results from the recognition process. In practice, the tests that are conducted to identify the unistroke symbol that best fits any given ordered list of x-y components are dictated in substantial part by the geometric details of the particular unistroke alphabet that is employed. For example, the unistroke alphabet shown in FIG. 2 lends itself to the following recognition methodology:

1. Accumulate ordered list of coordinate pairs, $(x1, y1), \ldots, (xn, yn)$, to characterize stroke;
2. Filter list to remove noise and to otherwise smooth characterization of stroke;
3. Test for straight lines (if straight line, find slope, use slope as index for performing character lookup function, then exit);
4. If not a straight line, normalize the stroke to fit in a square bounding box.

Then compute the following 6 features:

$dx=xn-x1$ (i.e., the displacement between the origin and terminus of the stroke as measured on the x-axis), $dy = yn - y1$ (i.e., the displacement between the origin and terminus of the stroke as measured on the y-axis), $1/2 - dx = x(n/2) - x1$ (i.e., the displacement between the origin and the geometric midpoint of the stroke as measured on the x-axis), $1/2 - dy = y(n/2) - y1$ (i.e., the displacement between the origin and the geometric midpoint of the stroke as measured on the y-axis), $|dx| = |x2 - x1| + |x3 - x2| + \ldots + |xn - x(n-1)|$ (i.e., the cumulative length of the stroke as projected onto the x-axis); and $|dy| = |y2 - y1| + |y3 - y2| + \ldots + |yn - y(n-1)|$ (i.e., the cumulative length of the stroke as projected onto the y-axis);

5. Find the unistroke whose features are closest to the ones computed in step #4, using Table 1 below;
6. If step #5 gives the answer of 'u' or 'o', determine whether the slope vector of the stroke rotates in a clockwise direction or a counterclockwise direction to decide whether the stroke is a 'u' or an 'o', respectively.

TABLE 1

|  | dx | dy | ½-dx | ½-dy | \|dx\| | \|dy\| |
|---|---|---|---|---|---|---|
| a | 0.0 | −1.0 | 0.0 | −0.5 | 0.0 | 1.0 |
| b | 0.0 | 1.0 | 1.0 | 0.5 | 2.0 | 1.0 |
| c | 0.0 | −1.0 | −1.0 | −0.5 | 2.0 | 1.0 |
| d | 0.0 | 1.0 | −1.0 | 0.5 | 2.0 | 1.0 |
| e | −1.0 | 0.0 | −0.5 | 0.0 | 1.0 | 0.0 |
| f | −1.0 | 1.0 | −1.0 | 0.0 | 1.0 | 1.0 |
| g | 1.0 | −1.0 | 0.5 | 0.0 | 1.0 | 1.0 |
| h | 1.0 | 1.0 | 1.0 | 0.0 | 1.0 | 1.0 |
| i | 0.0 | 1.0 | 0.0 | 0.5 | 0.0 | 1.0 |
| j | −1.0 | 1.0 | 0.0 | 1.0 | 1.0 | 1.0 |
| k | 1.0 | −1.0 | 0.5 | −0.5 | 1.0 | 1.0 |
| l | 1.0 | 1.0 | 0.0 | 1.0 | 1.0 | 1.0 |
| m | −1.0 | 0.0 | −0.5 | −1.0 | 1.0 | 2.0 |
| n | 1.0 | 0.0 | 0.5 | −1.0 | 1.0 | 2.0 |
| o | −0.5 | 0.5 | −1.0 | 1.0 | 1.5 | 1.5 |
| o | −1.0 | 0.0 | −0.5 | 1.0 | 2.0 | 2.0 |
| p | 0.0 | 1.0 | 1.0 | 0.5 | 2.0 | 2.0 |
| q | 0.0 | 1.0 | −1.0 | 0.5 | 2.0 | 2.0 |
| r | 1.0 | 1.0 | 0.5 | 0.5 | 1.0 | 1.0 |
| s | −1.0 | 1.0 | −0.5 | 0.5 | 2.0 | 1.0 |
| t | 1.0 | 0.0 | 0.5 | 0.0 | 1.0 | 0.0 |
| u | −1.0 | 0.0 | −0.5 | 1.0 | 1.0 | 2.0 |
| v | 1.0 | 0.0 | 0.5 | 1.0 | 1.0 | 2.0 |
| w | 1.0 | 1.0 | 0.5 | 0.5 | 1.0 | 3.0 |
| x | 1.0 | 0.0 | 0.5 | 1.0 | 2.0 | 2.0 |
| y | −1.0 | 1.0 | −0.5 | 0.5 | 1.0 | 1.0 |
| z | 1.0 | 1.0 | 0.5 | 0.5 | 2.0 | 1.0 |
| bkspc | −1.0 | −1.0 | −0.5 | −0.5 | 2.0 | 1.0 |

As will be seen, there are alternate characterizations in Table 1 for the unistroke symbol that is assigned to the character 'o' (see FIG. 2) because it has been found that that particular symbol is often written in open form (i.e., without completing the overlapping tail of the stroke). Also, the cumulative lengths of the x-axis projection of the unistroke symbols for 's' and 'z' are specified as having nominal values of 2.0, but these specifications are subject to change because the available evidence indicate that 3.0 might work better in practice.

A Modula-3 program that implements the above-described recognition methodology for unistroke symbols that are characterized by streams or files of ordered x,y coordinate pairs is appended hereto.

As previously pointed out, a user actuatable button (such as the button on the barrel of the stylus 51 in FIG. 5) and/or special unistroke symbols that are dedicated to specified control functions (such as the unistroke control symbols shown in FIG. 2) can be used to provide the additional differentiation that is needed by the recognition unit 36 to accurately interpret unistroke symbols that are used to encode multiple alphanumeric symbols (such as lower case and upper case alphabetic symbols and/or alphabetic symbols and numeric symbols). As will be understood, the additional differentiation that is provided by these button triggered control signals and/or symbolic flags enables the recognition unit 36 to switch from one lookup table to another for the decoding of successive unistroke symbols.

Figure 4:
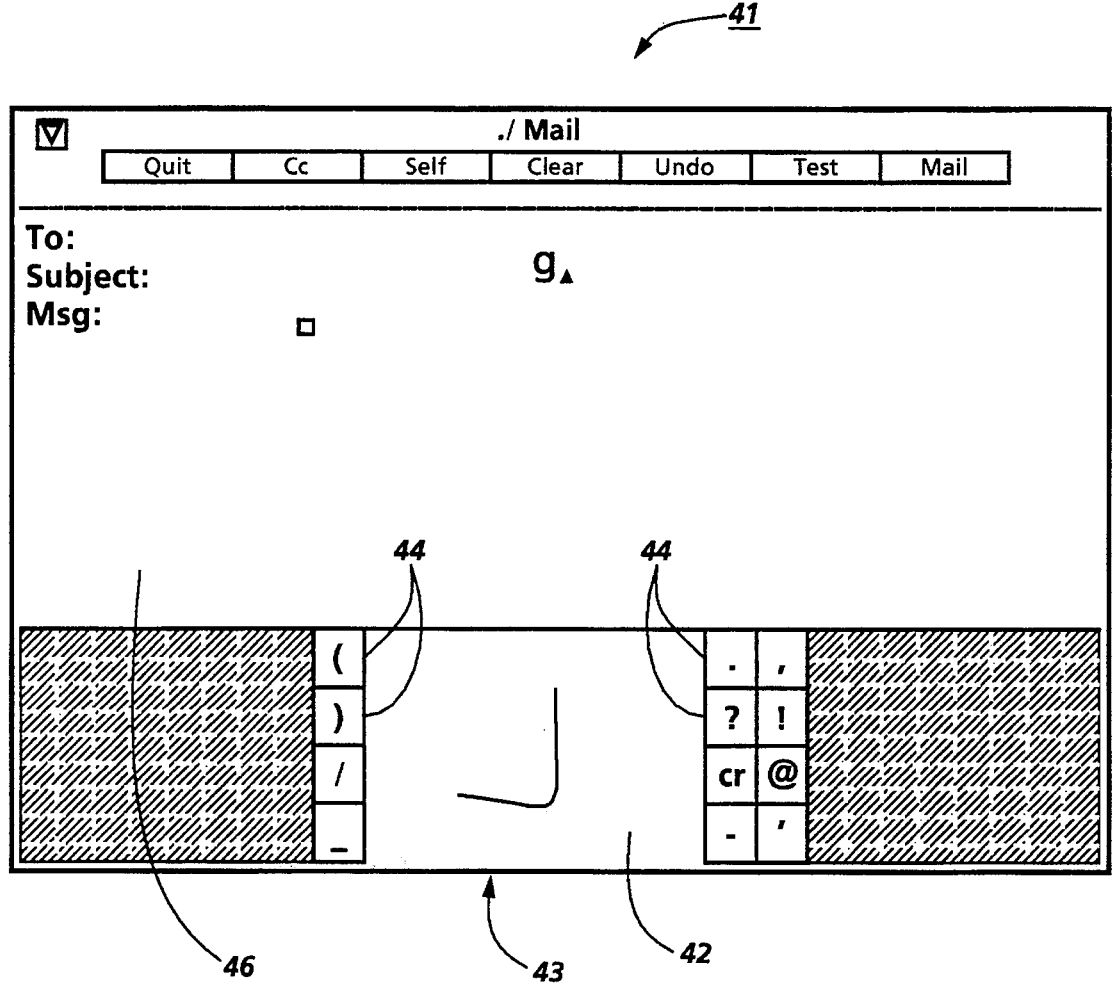
FIG. 4 shows a suitable user interface for an interpreted text entry system that embodies the present invention.

Turning now to FIG. 4, it now will be evident that unistroke symbols are especially well suited for "eyes-free" handwriting because each symbol is defined by a single stroke which, in turn, is delimited by moving the stylus 31 into and out of contact with the writing surface 32. Eyes-free operation is not only important for the sight impaired, but also for "heads-up" writing while transcribing text, taking notes while visually observing events, etc. Furthermore, unistroke symbols may be written one on top of another because they are interpreted in the order in which they are written and they are unambiguously differentiated from each other by being defined by different strokes. Thus, the symbols may be employed to advantage for handwriting text into computers that have small text entry fields, such as the computer 41 with its text entry field 42. Indeed, the use of spatially overlapping symbols for text entry tends to be less tiring than ordinary handwriting because it does not require wrist movement. Spaces between words typically are indicated by a tap of the stylus 31 against the writing surface 32, so the dot-like symbol that is produced by such a tap suitably is discriminated from the other unistrokes by the relatively small size of the dot-like symbol.

If desired, the user interface 43 for the computer 41 may include one or more "soft-keys", such as at 44, for entering compositional characters and/or control codes through the use of a point and select methodology. Additionally, the user interface 43 may have a text editing field 46 for displaying the text of the message that is being entered and for sensing any gesture based editing commands that the user may enter.

Advantageously, the tactile feedback that a user receives while using unistroke symbols for entering text for computer interpretation in accordance with this invention is similar to the usual tactile sensation of using pen and paper to handprint text. To this end, the origin of a unistroke symbol suitably is defined by sensing the point at which the contact pressure between the stylus 31 and the writing surface 32 first exceeds a threshold level, while the terminus of such a symbol by the point at which the contact pressure betwen the stylus 31 and the writing surface 32 is confirmed to have dropped below the threshold level.

CONCLUSION

In view of the foregoing, it now will be evident that the present invention provides a method computerized interpretation of handwritten text with substantial accuracy at modest processing cost. Expert users can employ unistrokes for writing text at high speed. In accordance with this invention, the unistroke symbols are readily discriminable from each other, even when imperfectly formed. Moreover, the unistroke text entry technique of this invention is well suited for writing text through the use of a stylus and the like, including for applications involving "eyes-free" text entry. Conceivably, this invention could be extended to facilitate the recognition of text that is written in three dimensional space using unistroke symbols that are characterized by order lists of x, y, z coordinate triplets. In some applications, the "pointer" that is used to write the unistroke symbols may be a finger or the like of the writer, such as when the unistroke symbols are written on a touch sensitive screen.

For additional details, Goldberg et al., "Touch-Typing with a Stylus," CSL-93-1, Xerox Corporation Palo Alto Research Center, May 1993 hereby is incorporated by reference. That paper also appeared in the Proceedings of INTERCHI '93, Conference on Human Factors in Computing Systems, Apr. 24–29, 1993, Amsterdam, pp. 80–87.

What is claimed:

1. A system for interpreting handwritten text comprising
    a user interface including a manually manipulatable pointer for writing mutually independent unistroke symbols in sequential time order and a user controlled signaling mechanism for performing a predetermined, symbol independent, delimiting operation between successive unistroke symbols in said sequential order, some of said unistroke symbols being linear and others being arcuate, each of said unistroke symbols representing a predefined textual component said delimiting operation distinguishing said unistroke symbols from each other totally independent of without reference to their spatial relationship with respect to each other;
    a sensor mechanism coupled to said user interface for transforming said unistroke symbols into corresponding ordered lists of spatial coordinates in said sequential order;
    a recognition unit coupled to respond to said sensor mechanism for convening said ordered lists of coordinates into corresponding computer recognizable codes in said sequential order, each of said codes representing a corresponding textual component;
    a display; and
    a character generator coupled to said recognition unit and to said display for writing the textual components defined by said codes on said display in a spatial order that corresponds to the sequential order of said codes.

2. The system of claim 1 wherein
    said user interlace further includes a substantially planar writing surface;
    said unistroke symbols are written on said writing surface, and
    said sensor mechanism transforms each of said unistroke symbols into an ordered list of x,y coordinate pairs.

3. The system of claim 2 wherein
    said pointer is a passive device that is manually engaged with, drawn across, and then disengaged from said writing surface to define the geometric shape and direction of each of said unistroke symbols; and
    said writing surface is interfaced with said sensor mechanism for inputting the geometric shape and direction of each of said unistroke symbols to said sensor mechanism.

4. The system of claim 2 wherein
    said pointer is manually engaged with, drawn across, and then disengaged from said writing surface to define the geometric shape and direction of each of said unistroke symbols;
    said writing surface is interfaced with said sensor mechanism for inputting the geometric shape and direction of each of said unistroke symbols to said sensor mechanism;
    said pointer includes a manually operable actuator for entering user commands, said user commands being communicated to said recognition unit for altering the response of said recognition unit to said unistroke symbols at the command of the user.

5. The system of claim 2 wherein
    said pointer is an active device that is manually engaged with, drawn across, and then disengaged from said writing surface to define the geometric shape and direction of each of said unistroke symbols; and
    said sensor mechanism is interfaced with said pointer for transforming the geometric shape and direction of each of said unistroke symbols into an ordered list of x,y coordinate pairs.

6. The system of claim 2 wherein
    said pointer is manually engaged with, drawn across, and then disengaged from said writing surface to generate data defining the geometric shape and direction of each of said unistroke symbols; and
    said pointer and said writing surface are pressure sensitive devices that are interfaced with said sensor mechanism for feeding the data defining the geometric shape and direction of each of said unistroke symbols into said sensor mechanism.

7. The system of any of claims 2–6 wherein
    said pointer is a stylus.

8. The system of claim 2 wherein
    said unistroke symbols are delimited from each other in said sequential time order by making and breaking contact between said pointer and said writing surface once for each unistroke symbol.

9. The system of claims 2, 3, 4, 5 or 6 wherein said unistroke symbols are well separated from each other in sloppiness space.

10. A machine implemented method for interpreting handwritten text comprising
    writing said text in sequential time order using an alphabet of mutually independent unistroke symbols to spell out said text at an atomic level, each of said unistroke symbols conforming to a respective graphical specification that includes a stroke direction parameter, some of said unistroke symbols having graphical specifications that differ from each other essentially only on the basis of their respective stroke direction parameters, some of said unistroke symbols being linear and others being arcuate;
    entering a predetermined, symbol independent delimiter between successive ones of said unistroke symbols in said time order, said delimiter distinguishing successive unistroke symbols from each other without reference to and totally independently of their spatial relationship with respect to each other;
    capturing the stroke direction of each of said unistroke symbols as an ordered list of coordinates;
    disambiguating said unistroke symbols from each other based upon predetermined criteria, including the stroke directions of the respective symbols.

11. The method of claim 10 wherein said unistroke symbols are well separated from each other in sloppiness space.

12. A handwriting recognition process for pen computers, said process comprising the steps of
    correlating unistroke symbols with natural language alphanumeric symbols, each of said unistroke symbols being fully defined by a single continuous stroke that conforms geometrically and directionally to a predetermined graphical specification, some of said unistroke symbols being linear and others being arcuate;
    entering user written unistroke symbols into buffer memory in sequential time order, successive ones of said unistroke symbols being delimited from each other by a predetermined, symbol independent delimiting operation, said delimiting operation distinguishing successive unistroke symbols from each other without reference to and totally independently of their spatial relationship with respect to each other;

reading out said unistroke symbols from buffer memory in sequential time order to provide buffered unistroke symbols;

translating each buffered unistroke symbol that correlates with a natural language symbol into said natural language symbol; and outputting any natural language symbols that are produced by such translating to a utilization device.

13. The handwriting recognition process of claim 12 wherein certain unistroke symbols correlate with natural language alphanumeric symbols, and other unistroke symbols correlate with user invokeable control functions.

14. The handwriting recognition process of claim 13 wherein at least one of said other unistroke symbols correlates with a control function that shifts the correlation of at least some of said certain unistroke symbols from one set of natural language alphanumeric symbols to another set of natural language alphanumeric symbols.

15. The handwriting recognition process of claim 14 wherein said control function shifts said correlation for just one following unistroke symbol and then restores said correlation to an initial state.

16. A machine implemented handwriting recognition process comprising the steps of correlating natural language symbols with unistroke symbols, where each of said unistroke symbols is fully defined by a single continuous stroke that conforms geometrically and directionally to a predetermined graphical specification, at least certain of said unistroke symbols being arcuate;

writing user selected unistroke symbols in sequential time order while performing a predetermined, symbol independent delimiting operation for delimiting successive ones of said unistroke symbols from each other, said delimiting operation distinguishing successive unistroke symbols from each other without reference to and totally independently of the spatial relationship of said unistroke symbols with respect to each other;

detecting said selected unistroke symbols; and translating the detected unistroke symbols that are written into said machine into a corresponding natural language representation.

\* \* \* \* \*

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

In the drawings, Sheet 2, Fig. 5, the reference numbered 51 and 52 should be applied to the stylus and the writing surface, respectively that are shown on the left. A corrected copy of Fig. 5 follows:

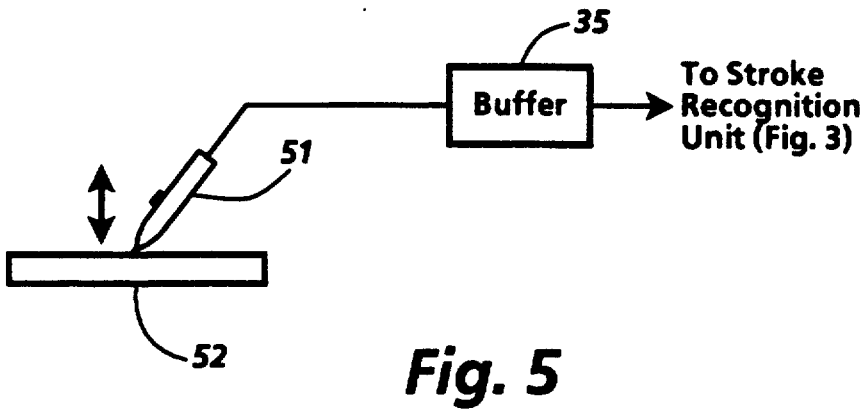

Fig. 5

END: UNITED STATES PATENT AND TRADEMARK OFFICE
CERTIFICATE OF CORRECTION

PATENT NO. : 5,596,656

DATED : January 21, 1997

INVENTOR(S) : David Goldberg

Page 2 of 30

It is certified that error appears in the above-identified patent and that said Letters Patent is hereby corrected as shown below:

(continued from previous page)

Column 1, line 6, before "Field of the Invention" insert the following paragraph:

--A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.--

Column 3, line 18, change in "stoke" to --stroke--. Column 4, line 9, change "fined grained" to --fine grain--. Column 5, line 61, change "is appended hereto" to --follows:

Table

---

```
(*
 * Copyright (c) Xerox Corporation 1991, 1992, 1993
 *)

INTERFACE Recog;

IMPORT Point, Rect, Rd, Wr, Time;
IMPORT Thread; (* for RAISES clause *)

CONST
    Version     = '4';         (* version of recognizer file format *)
    Unknown     = '@';
    NoOptions = Options{};

TYPE
    Option = {SimpleTrim, DontTrim, Liveboard, FatDot};
    Options = SET OF Option;
    RecogStuff <: REFANY;
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
Stroke = RECORD
    ch           : CHAR;                          (* putative value *)
    guess        : CHAR := Unknown;               (* best guess *)
    guess1       : CHAR := Unknown;               (* second best guess *)
    dist, dist1  : REAL := -1.0;                  (* distance for guess, guess1 *)
    bound        : Rect.T;
    trueBound    : Rect.T;                        (* includes trimmed points *)
    pts          : REF ARRAY OF Point.T;
    times        : REF ARRAY OF CARDINAL := NIL;  (* timestamps for points *)
    start, stop  : CARDINAL;                      (* pts[start]..pts[stop] is trimed sequence *)
    duration     : CARDINAL;                      (* times[LAST] - times[FIRST]) *)
    oneFrac      : REAL;                          (* fraction of points dist 1 apart *)
    thin         : REF ARRAY OF Point.T;          (* thinned out points *)
    slopes       : REF ARRAY OF REAL;             (* slopes of a thinned stroke *)
    slopeAv      : CARDINAL;                      (* av (degrees) of slopes of middle 60% of pts *)
    slopeVar     : REAL;                          (* variance of slopes of middle 60% of pts *)
    specialCase := FALSE;                         (* a special case test was used *)
    dTheta       : REAL := -100.0;
    (* average deriv of theta, only set when guess = 'o' or 'u' could replace -100 with any value outside range
                   (-pi, pi) *)
    stemRatio                                     : REAL := 0.0;
        (* ratio of lnth of right half straight line to left half. Only set when guess is 'i' *)
    stuff: RecogStuff := NIL;
END;

PROCEDURE FromFile (rd: Rd.T; options := NoOptions): REF ARRAY OF Stroke;
(* read in file, return array of strokes with recognition fields guess, guess1 filled in *)

PROCEDURE ToFile (READONLY strks: ARRAY OF Stroke; wr: Wr.T)
    RAISES {Wr.Failure, Thread.Alerted};
(* reverse of FromFile *)
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
PROCEDURE FromPts (READONLY pts: ARRAY OF Point.T;
                   READONLY times: ARRAY OF CARDINAL := ARRAY [0 .. -1] OF CARDINAL{};
                   ch       : CHAR := Unknown;
                   options := NoOptions): Stroke;
(* take an array of pts, return stroke structure for those points with the recognition fields guess, guess1 filled in *)

PROCEDURE GetRecogStuff (READONLY strk: Stroke): REF ARRAY OF TEXT;
(* returns a sequence of strings, with info about the recognition. *)

PROCEDURE TimeToInt (tm: Time.T; init := -1): CARDINAL;
(* Convert time to form used in Stroke.  Default value of init is interpreted to mean time program was started *)

END Recog.

(*
 * Copyright (c) Xerox Corporation 1991, 1992, 1993
 *)

MODULE Recog;

IMPORT Rect, Point, Math, Rd, Convert, Fmt, FileStream, Cstdlib;
IMPORT Word, Time, Wr, Char, Stdio, Stat;
FROM Convert IMPORT ToFloat;
IMPORT Thread;

IMPORT Bundle, RecogBundle;

<* UNUSED *> VAR
 rcsid := "$Id: Recog.m3,v 1.48 1993/05/27 23:21:40 goldberg" & "Exp goldberg $";
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
REVEAL
  RecogStuff = BRANDED REF RECORD
                          this  : Feature;
                          other : TEXT := "";
                          tblInd: CARDINAL; (* index into table for guess *)
                        END;

CONST
  UnInit     = VAL(0, CHAR);
  SlopeVar  = 0.36;            (* straight line if slop var < this *)
  DotCntMin = 11;              (* dot if point cnt  < DotCntMin *)
  DotCntMax = 17;               (* not dot if point cnt > DotCntMax *)

DotSizeMin = 36;
  DotSizeMax = 65;

DotTimeMin = 100;
  DotTimeMax = 330;

DotOneCnt = 20;     (* if count less than this than use One Bound *)
  DotOneFrac = 0.195;   (* fraction of 1's *)
(*FlatBound = 2.4;(* ratio at which you assume letter is "flat" hor or vert *) *)

Nstrokes = 2000; (* max strokes per file *)
  Npts     = 200;  (* max points per stroke *)
TYPE
      Feature = RECORD
                  deltax, deltay       : REAL;
                  halfDeltax, halfDeltay: REAL;
                  absDeltax, absDeltay : REAL;
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
            END;
      Table = RECORD
              ch: CHAR;
              f : Feature;
            END;
VAR
VAR
  table    : ARRAY [0..100] OF Table;
  tableLn  : CARDINAL := 0;

PROCEDURE Put (txt: TEXT) =
  <* FATAL Wr.Failure, Thread.Alerted *>
  BEGIN
    Wr.PutText(Stdio.stderr, txt);
    Wr.Flush(Stdio.stderr);
  END Put;

(* different from Rect.VerSize *)
PROCEDURE VerSize (READONLY r: Rect.T): CARDINAL RAISES { } =
  BEGIN
    (* IF r.west >= r.east THEN RETURN 0 ELSE RETURN r.south - r.north END *)
    RETURN r.south - r.north
  END VerSize;

PROCEDURE ReadTable(rd: Rd.T) =

PROCEDURE Skip() =
    BEGIN
      WHILE (arr[i] = ' ') DO INC(i); END;
    END Skip;
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
CONST arrLnth = 100; (* max lnth of line in input file *)
<* FATAL Rd.Failure, Convert.Failed, Thread.Alerted *>
VAR
  i, n, used: INTEGER;
  arr: ARRAY [0..arrLnth-1] OF CHAR;
  ch: CHAR;
BEGIN
  tableLn := 0;
  LOOP
    n := Rd.GetSubLine(rd, arr);
    IF n = 0 THEN EXIT END;
    ch := arr[0];
    IF ch # '#' AND ch # Char.NL THEN (* # is comment *)
      table[tableLn].ch := ch;
      WITH f = table[tableLn].f DO
        i := 1;
        Skip();
        f.deltax := ToFloat(SUBARRAY(arr, i, arrLnth - i), used);

INC(i, used);
        Skip();
        f.deltay := ToFloat(SUBARRAY(arr, i, arrLnth - i), used);

INC(i, used);
        Skip();
        f.halfDeltax := ToFloat(SUBARRAY(arr, i, arrLnth - i), used);

INC(i, used);
        Skip();
        f.halfDeltay := ToFloat(SUBARRAY(arr, i, arrLnth - i), used);
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
        INC(i, used);
        Skip();
        f.absDeltax := ToFloat(SUBARRAY(arr, i, arrLnth - i), used);

INC(i, used);
        Skip();
        f.absDeltay := ToFloat(SUBARRAY(arr, i, arrLnth - i), used);
      END;
      INC(tableLn);
    END;
  END;
END ReadTable;

PROCEDURE IsDot (strk: Stroke; options := NoOptions): BOOLEAN =
  BEGIN
  WITH n    = NUMBER(strk.pts^),
       size = MAX(Rect.HorSize(strk.trueBound), VerSize(strk.trueBound)) DO
    IF Option.Liveboard IN options THEN
      RETURN n <= 3 OR size <= 4 OR (n <= 5 AND size <= 9 AND strk.oneFrac >= 0.250)
    END;
    IF Option.FatDot IN options THEN
      RETURN n <= 24 OR size <= 72 OR (strk.oneFrac >= 0.20 AND n <= 30);
    END;
    IF n > DotCntMax OR size > DotSizeMax OR n > DotCntMax
         OR strk.duration > DotTimeMax THEN
      RETURN (FALSE);
    ELSE
      RETURN (n < DotCntMin OR size < DotSizeMin OR n < DotCntMin
                 OR strk.duration < DotTimeMin
                 OR (n < DotOneCnt AND strk.oneFrac > DotOneFrac));
    END;
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
  END;
 END IsDot;

PROCEDURE Dist(READONLY t1, t2: Feature): REAL =
 VAR sum := 0.0;
 BEGIN
   sum := sum + ABS(t1.deltax - t2.deltax);
   sum := sum + ABS(t1.deltay - t2.deltay);
   sum := sum + ABS(t1.halfDeltax - t2.halfDeltax);
   sum := sum + ABS(t1.halfDeltay - t2.halfDeltay);
   sum := sum + ABS(t1.absDeltax - t2.absDeltax);
   sum := sum + ABS(t1.absDeltay - t2.absDeltay);
   RETURN(sum);
 END Dist;

PROCEDURE Thin (pts: REF ARRAY OF Point.T; start, stop: INTEGER): REF ARRAY OF Point.T =
   VAR
     arr    : ARRAY [0 .. 500] OF Point.T;
     res    : REF ARRAY OF Point.T;
     prevPt : Point.T;
     j      : INTEGER := 1;
   BEGIN
     prevPt := pts[start];
     arr[0] := prevPt;
     FOR i := start + 1 TO stop DO
     WITH pt = pts[i] DO
       IF ABS(pt.h - prevPt.h) + ABS(pt.v - prevPt.v) > 2 THEN
         arr[j] := pt;
         prevPt := pt;
         INC(j);
       END;
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
    END;
  END;
  res := NEW(REF ARRAY OF Point.T, j);
  res^ := SUBARRAY(arr, 0, j);
  RETURN res;
END Thin;

PROCEDURE CmpOU (VAR strk: Stroke): CHAR =

PROCEDURE TurningAngle (VAR strk: Stroke): REAL =
    VAR angle, prevAngle, sum: REAL;
    BEGIN
      sum := 0.0;
      (* thin out, so fewer arctan calls *)
      prevAngle := -100.0; (* not a possible value of atan2 *)
      WITH slopes = strk.slopes DO
        FOR i := FIRST(slopes^) TO LAST(slopes^) DO
          angle := slopes[i];
          IF prevAngle > -100.0 THEN sum := sum + (prevAngle - angle); END;
          prevAngle := angle;
        END;
      END;
      RETURN (sum);
    END TurningAngle;

BEGIN
    strk.dTheta := TurningAngle(strk);
    IF strk.dTheta > 2.0 THEN RETURN ('o') ELSE RETURN ('u') END;
  END CmpOU;

PROCEDURE CmpIL (VAR strk: Stroke): CHAR =
```

UNITED STATES PATENT AND TRADEMARK OFFICE
CERTIFICATE OF CORRECTION

PATENT NO.    : 5,596,656

DATED         : January 21, 1997

INVENTOR(S)   : David Goldberg

It is certified that error appears in the above-identified patent and that said Letters Patent is hereby corrected as shown below:

(continued from previous page)

```
PROCEDURE StemRatio (VAR strk: Stroke): REAL =
  CONST
    pi   = 3.14159265358979323846264338327б;
    twoPi = 6.28318530717958647692528676б552;
  VAR
    ratio, slope: REAL;
    mark       : CARDINAL;
  BEGIN
    WITH slopes = strk.slopes,
         thin   = strk.thin   DO
      FOR i := FIRST(slopes^) TO LAST(slopes^) DO
        slope := slopes[i];
        WHILE slope >= twoPi DO slope := slope - twoPi END;
        WHILE slope < 0.0 DO slope := slope + twoPi END;
        IF slope > pi / 3.0 AND slope < twoPi / 3.0 THEN mark := i;EXIT;END;
      END;
      ratio := FLOAT(thin[LAST(thin^)].h - thin[mark].h) / FLOAT(
               thin[mark].v - thin[FIRST(thin^)].v);
    END;
    RETURN (ratio);
  END StemRatio;

BEGIN
  strk.stemRatio := StemRatio(strk);
  IF strk.stemRatio > 0.2 THEN RETURN ('l') ELSE RETURN ('i') END;
END CmpIL;

PROCEDURE Slope (VAR strk: Stroke) =
  CONST
    pi   = 3.14159265358979323846264338327б;
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
  twoPi = 6.28318530717958647692528676655Z;
VAR
  pts           : REF ARRAY OF Point.T;
  pt1, pt2      : Point.T;
  y, x, tmp     : INTEGER;
  angle, diff   : REAL;
  arr           : REF ARRAY OF REAL;
  j             : CARDINAL;
  st            : Stat.T;
  start, stop   : CARDINAL;
  prevAngle    := -100.0;          (* not a possible value of atan2 *)
BEGIN
  (* thin out, so fewer arctan calls *)
  pts := Thin(strk.pts, strk.start, strk.stop);
  arr := NEW(REF ARRAY OF REAL, NUMBER(pts^) - 1);
  strk.thin := pts;
  strk.slopes := arr;
  j := 0;
  Stat.Init(st);
  start := NUMBER(arr^) DIV 5;
  stop := MAX(NUMBER(arr^) - start - 1, start);
  FOR i := FIRST(pts^) TO LAST(pts^) - 1 DO
    pt1 := pts[i];
    pt2 := pts[i + 1];
    y := pt2.v - pt1.v;
    x := pt2.h - pt1.h;
    angle := FLOAT(Math.atan2(FLOAT(y, LONGREAL), FLOAT(x, LONGREAL)));
    IF prevAngle # -100.0 THEN
      diff := prevAngle - angle;
      WHILE diff < -pi DO angle := angle - twoPi; diff := diff + twoPi; END;
      WHILE diff > pi DO angle := angle + twoPi; diff := diff - twoPi; END;
```

UNITED STATES PATENT AND TRADEMARK OFFICE
CERTIFICATE OF CORRECTION

Page 13 of 30

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
    END;
    arr[j] := angle;
    IF j >= start AND j <= stop THEN Stat.Accum(st, FLOAT(angle)); END;
    INC(j);
    prevAngle := angle;
  END;
  tmp := ROUND(Stat.Mean(st) * 57.29578); (* radians to degrees *)
  WHILE tmp < 0 DO tmp := tmp + 360 END;
  WHILE tmp >= 360 DO tmp := tmp - 360 END;
  strk.slopeAv := tmp;
  strk.slopeVar := Stat.Var(st);
 END Slope;

PROCEDURE Recog (VAR strk: Stroke; options := NoOptions) =
  VAR ch: CHAR;
  BEGIN
    Recog1(strk, options);
    (* XXX: this next bit should be file driven *)
    IF strk.guess = 'o' OR strk.guess = 'u' THEN
      ch := CmpOU(strk);
      (*   ELSIF strk.guess = 'i' THEN ch := CmpIL(strk);*)
    ELSE
      RETURN
    END;
    IF ch # strk.guess THEN
      strk.specialCase := TRUE;
      IF strk.guess1 = ch THEN strk.guess1 := strk.guess; END;
      strk.guess := ch;
    END;
  END Recog;
```

UNITED STATES PATENT AND TRADEMARK OFFICE
CERTIFICATE OF CORRECTION

PATENT NO.    : 5,596,656

DATED         : January 21, 1997

INVENTOR(S)   : David Goldberg

It is certified that error appears in the above-identified patent and that said Letters Patent is hereby corrected as shown below:

(continued from previous page)

```
VAR
  SlopeTable      : ARRAY [0..359] OF CHAR; (* const *)
  SloppySlopeTable: ARRAY [0..359] OF CHAR; (* const *)

PROCEDURE InitSlopeTable () =
  (*
  * t   0     (0-22, 343 - 387)
  * r   45    (23-67)
  * i   90    (68-112)
  * y   135   (113-157)
    e   180   (158-202)
  * ?   225   (203 - 247)
  * a   270   (248-292)
  * k   315   (293-337)
  *)
  BEGIN
    FOR i := 0 TO 22 DO SlopeTable[i] := 't'; END;
    FOR i := 23 TO 67 DO SlopeTable[i] := 'r'; END;
    FOR i := 68 TO 112 DO SlopeTable[i] := 'i'; END;
    FOR i := 113 TO 157 DO SlopeTable[i] := 'y'; END;
    FOR i := 158 TO 202 DO SlopeTable[i] := 'e'; END;
    FOR i := 203 TO 247 DO SlopeTable[i] := '@'; END;
    FOR i := 248 TO 292 DO SlopeTable[i] := 'a'; END;
    FOR i := 293 TO 337 DO SlopeTable[i] := 'k'; END;
    FOR i := 338 TO 359 DO SlopeTable[i] := 't'; END;

FOR i := 0 TO 359 DO SloppySlopeTable[i] := UnInit; END;
    FOR i := 13 TO 22 DO SloppySlopeTable[i] := 'r'; END;
    FOR i := 23 TO 32 DO SloppySlopeTable[i] := 't'; END;
    FOR i := 58 TO 67 DO SloppySlopeTable[i] := 'i'; END;
    FOR i := 68 TO 77 DO SloppySlopeTable[i] := 'r'; END;
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
   FOR i := 103 TO 112 DO SloppySlopeTable[i] := 'y'; END;
   FOR i := 113 TO 122 DO SloppySlopeTable[i] := 'i'; END;
   FOR i := 148 TO 157 DO SloppySlopeTable[i] := 'e'; END;
   FOR i := 158 TO 167 DO SloppySlopeTable[i] := 'y'; END;
   FOR i := 193 TO 202 DO SloppySlopeTable[i] := '@'; END;
   FOR i := 203 TO 212 DO SloppySlopeTable[i] := 'e'; END;
   FOR i := 238 TO 247 DO SloppySlopeTable[i] := 'a'; END;
   FOR i := 248 TO 257 DO SloppySlopeTable[i] := '@'; END;
   FOR i := 283 TO 292 DO SloppySlopeTable[i] := 'k'; END;
   FOR i := 293 TO 302 DO SloppySlopeTable[i] := 'a'; END;
   FOR i := 327 TO 337 DO SloppySlopeTable[i] := 't'; END;
   FOR i := 338 TO 347 DO SloppySlopeTable[i] := 'k'; END;
 END InitSlopeTable;

PROCEDURE Recog1 (VAR strk: Stroke; options := NoOptions) =

PROCEDURE Update (ch: CHAR; other: TEXT := NIL; dist := -1.0) =
   BEGIN
     IF strk.guess = Unknown THEN
       strk.guess := ch;
       IF dist # -1.0 THEN strk.dist := dist; END;
     ELSE
       strk.guess1 := ch;
       IF dist # -1.0 THEN strk.dist1 := dist; END;
     END;
     IF other # NIL THEN strk.stuff.other := Fmt.F("%s %s ", strk.stuff.other, other);END;
   END Update VAR
   f              : Feature;
   minF, minFSave: CARDINAL;
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
   FOR i := 103 TO 112 DO SloppySlopeTable[i] := 'y'; END;
   FOR i := 113 TO 122 DO SloppySlopeTable[i] := 'i'; END;
   FOR i := 148 TO 157 DO SloppySlopeTable[i] := 'e'; END;
   FOR i := 158 TO 167 DO SloppySlopeTable[i] := 'y'; END;
   FOR i := 193 TO 202 DO SloppySlopeTable[i] := '@'; END;
   FOR i := 203 TO 212 DO SloppySlopeTable[i] := 'e'; END;
   FOR i := 238 TO 247 DO SloppySlopeTable[i] := 'a'; END;
   FOR i := 248 TO 257 DO SloppySlopeTable[i] := '@'; END;
   FOR i := 283 TO 292 DO SloppySlopeTable[i] := 'k'; END;
   FOR i := 293 TO 302 DO SloppySlopeTable[i] := 'a'; END;
   FOR i := 327 TO 337 DO SloppySlopeTable[i] := 't'; END;
   FOR i := 338 TO 347 DO SloppySlopeTable[i] := 'k'; END;
 END InitSlopeTable;

PROCEDURE Recog1 (VAR strk: Stroke; options := NoOptions) =

PROCEDURE Update (ch: CHAR; other: TEXT := NIL; dist := -1.0) =
  BEGIN
    IF strk.guess = Unknown THEN
      strk.guess := ch;
      IF dist # -1.0 THEN strk.dist := dist; END;
    ELSE
      strk.guess1 := ch;
      IF dist # -1.0 THEN strk.dist1 := dist; END;
    END;
    IF other # NIL THEN strk.stuff.other := Fmt.F("%s %s ", strk.stuff.other, other);END;
  END Update VAR
   f              : Feature;
   minF, minFSave: CARDINAL;
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
    mid             : INTEGER;
    wd, ht, min, d  : REAL;
    guess           : CHAR;
    other           : TEXT    := NIL;
  BEGIN
    IF strk.stuff = NIL THEN strk.stuff := NEW(RecogStuff); END;
    IF IsDot(strk, options) THEN
      Update(' ', Fmt.F("dot %s points", Fmt.Int(NUMBER(strk.pts^))));
    END;
    IF strk.slopeVar < SlopeVar THEN  (* straight line *)
      WITH av = strk.slopeAv DO
        guess := SlopeTable[av];
        other := Fmt.F("straight: slope %s, Var(slope) %s", Fmt.Int(av),
                Fmt.Real(strk.slopeVar, precision := 2));
        Update(guess, other);
        guess := SloppySlopeTable[av];
        IF guess # UnInit THEN Update(guess); END;
      END;
    END;

(* if already 2 guesses, then quit now *)
    IF strk.guess1 # Unknown THEN RETURN; END;

wd := FLOAT(Rect.HorSize(strk.bound));
    ht := FLOAT(VerSize(strk.bound));

(* if skinny, then can't get any further info, so quit now *)
    IF wd = 0.0 OR ht = 0.0 THEN RETURN; END;
    mid := (strk.start + strk.stop) DIV 2;
    WITH pts = strk.pts DO
      f.deltax := FLOAT((pts[strk.stop].h - pts[strk.start].h)) / wd;
```

UNITED STATES PATENT AND TRADEMARK OFFICE
CERTIFICATE OF CORRECTION

Page 18 of 30

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
    f.deltay := FLOAT((pts[strk.stop].v - pts[strk.start].v)) / ht;
    f.halfDeltax := FLOAT((pts[mid].h - pts[strk.start].h)) / wd;
    f.halfDeltay := FLOAT((pts[mid].v - pts[strk.start].v)) / ht;
    f.absDeltax := 0.0;
    f.absDeltay := 0.0;
    FOR i := strk.start + 1 TO strk.stop DO
       f.absDeltax := f.absDeltax + FLOAT(ABS(pts[i].h - pts[i - 1].h));
       f.absDeltay := f.absDeltay + FLOAT(ABS(pts[i].v - pts[i - 1].v));
    END;
    f.absDeltax := f.absDeltax / wd;
    f.absDeltay := f.absDeltay / ht;
 END;

min := 10000.0;
 FOR i := 0 TO tableLn - 1 DO
   d := Dist(table[i].f, f);
   IF d < min THEN minF := i; min := d; END;
 END;
 Update(table[minF].ch, dist := min);
 minFSave := minF;

IF strk.guess1 = Unknown THEN
   min := 10000.0;
   FOR i := 0 TO tableLn - 1 DO
     IF i # minFSave THEN
     d := Dist(table[i].f, f);
     IF d < min THEN minF := i; min := d; END;
   END;
 END;
 Update(table[minF].ch, dist := min);
END;
```

UNITED STATES PATENT AND TRADEMARK OFFICE
CERTIFICATE OF CORRECTION

PATENT NO.   : 5,596,656
DATED        : January 21, 1997
INVENTOR(S)  : David Goldberg It is certified that error appears in the above-identified patent and that said Letters Patent is hereby corrected as shown below:

(continued from previous page)

```
  strk.stuff.this := f;
  strk.stuff.tblInd := minFSave;
END Recog1;

(* XX: unfortunatley, may be more than one ind *)
PROCEDURE CharToInd (ch: CHAR): CARDINAL =
  BEGIN
    FOR i := 0 TO tableLn - 1 DO IF table[i].ch = ch THEN RETURN i; END;END;
    <* ASSERT FALSE *>
  END CharToInd;

PROCEDURE GetRecogStuff (READONLY strk: Stroke): REF ARRAY OF TEXT =

PROCEDURE Real (x: REAL): TEXT =
    BEGIN
      RETURN (Fmt.Pad(Fmt.Real(x, precision := 2, style := Fmt.Style.Flo), 5));
    END Real;

VAR
    ans   : REF ARRAY OF TEXT;
    ln, i : CARDINAL;
  BEGIN
    (* 6 should match vector in Display.m3 *)
    IF strk.ch # strk.guess THEN ln := 5; ELSE ln := 4; END;
    IF strk.stuff.other # NIL THEN INC(ln); END;
    ans := NEW(REF ARRAY OF TEXT, ln);
    i := 0;
    IF strk.stuff.other # NIL THEN ans[i] := strk.stuff.other; INC(i); END;
    ans[i] :=Fmt.F("d(%s)=%s  d(%s)=%s", Fmt.Char(strk.guess), Real(strk.dist),
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
        Fmt.Char(strk.guess1), Real(strk.dist1));
IF strk.ch # strk.guess AND strk.ch # strk.guess1 AND strk.ch # ' ' AND strk.ch # '@' THEN
  ans[i] := ans[i] & Fmt.F("  d(%s)=%s", Fmt.Char(strk.ch),
                    Real(Dist(table[CharToInd(strk.ch)].f, strk.stuff.this)));
END;
IF strk.specialCase THEN ans[i] := ans[i] & " (special)"; END;
INC(i);
ans[i] := "     Dx   Dy   halfDx halfDy absDx absDy";
INC(i);
WITH tbl = strk.stuff.this DO
  ans[i] := Fmt.FN(" this: %s  %s  %s  %s  %s  %s",
            ARRAY OF
              TEXT{Real(tbl.deltax), Real(tbl.deltay), Real(tbl.halfDeltax),
                   Real(tbl.halfDeltay), Real(tbl.absDeltax), Real(tbl.absDeltay)});

END;
INC(i);
IF strk.ch # ' ' AND strk.ch # '@' THEN
  WITH tbl = table[CharToInd(strk.ch)].f DO
    ans[i] := Fmt.FN(" ref(%s): %s  %s  %s  %s  %s  %s",
              ARRAY OF
                TEXT{Fmt.Char(strk.ch), Real(tbl.deltax), Real(tbl.deltay),
                     Real(tbl.halfDeltax), Real(tbl.halfDeltay),
                     Real(tbl.absDeltax), Real(tbl.absDeltay)});
  END;
ELSE
  ans[i] := "";
END;
INC(i);
IF strk.ch # strk.guess THEN
  WITH tbl = table[strk.stuff.tblInd].f DO
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
    ans[i] := Fmt.FN(" ref(%s): %s %s %s %s %s %s",
            ARRAY OF
              TEXT{Fmt.Char(strk.guess), Real(tbl.deltax), Real(tbl.deltay),
                 Real(tbl.halfDeltax), Real(tbl.halfDeltay),
                 Real(tbl.absDeltax), Real(tbl.absDeltay)}});
    END;
   END;
   RETURN (ans);
 END GetRecogStuff;

PROCEDURE PointDist(a, b: Point.T): CARDINAL =
  BEGIN
    RETURN
      (ROUND(Math.hypot(FLOAT(a.h - b.h, LONGREAL),FLOAT(a.v - b.v, LONGREAL))));
  END PointDist;

PROCEDURE Trim(VAR strk: Stroke) =

VAR
   n, trim       : CARDINAL;
   dist, prevDist : CARDINAL;
 BEGIN
   n := NUMBER(strk.pts^);
   (* don't trim short strokes *)
   IF n < 5 THEN strk.start := 0; strk.stop := LAST(strk.pts^); RETURN; END;
   (*
    * start trimming process at 'trim'. Trim is n/5, except is always at
    * least 3 and at most 6. Don't set trim to more points than there are
    * in stroke, that is, more than n-3.
    *)
   trim := MIN(MIN(MAX(n DIV 5, 3), n-3), 6);
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
   prevDist := PointDist(strk.pts[trim+1], strk.pts[trim]);
   strk.start := LAST(INTEGER);
   FOR i := trim TO 1 BY -1 DO
      dist := PointDist(strk.pts[i], strk.pts[i-1]);
      IF dist > 2*prevDist THEN strk.start := i; EXIT; END;

prevDist := dist;
   END;
   IF strk.start = LAST(INTEGER) THEN strk.start := n DIV 10; END;

(*
      trim := (n-1) - n DIV 5;
      prevDist := PointDist(strk.pts[trim-1], strk.pts[trim]);
      strk.stop := LAST(INTEGER);
      FOR i := trim TO n-2 DO
         dist := PointDist(strk.pts[i], strk.pts[i+1]);
         IF dist > 2*prevDist THEN strk.stop := i; EXIT; END;
         prevDist := dist;
      END;
      IF strk.stop = LAST(INTEGER) THEN
         strk.stop := (n-1) - n DIV 10;
      END;
   *)
   strk.stop := MAX(NUMBER(strk.pts^) - 3, strk.start);
   END Trim;

PROCEDURE ComputeData (VAR strk: Stroke; options: Options) =

PROCEDURE Bound (VAR bnd: Rect.T; first, last: INTEGER) =
   BEGIN
      bnd.west := LAST(INTEGER);
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
    bnd.east := FIRST(INTEGER);
    bnd.north := LAST(INTEGER);
    bnd.south := FIRST(INTEGER);
    FOR i := first TO last DO
      WITH pt = strk.pts[i] DO
        bnd.west := MIN(bnd.west, pt.h);
        bnd.east := MAX(bnd.east, pt.h);
        bnd.north := MIN(bnd.north, pt.v);
        bnd.south := MAX(bnd.south, pt.v);
      END;
    END;
  END Bound;

PROCEDURE SimpleTrim (VAR strk: Stroke) =
  BEGIN
    strk.start := 2;
    strk.stop := NUMBER(strk.pts^) - 3;
  END SimpleTrim;

PROCEDURE NoTrim (VAR strk: Stroke) =
  BEGIN
    strk.start := 0;
    strk.stop := NUMBER(strk.pts^) - 1;
  END NoTrim;

VAR
  oneCnt: INTEGER;
  n      : INTEGER;

BEGIN
  oneCnt := 0;
  n := NUMBER(strk.pts^);
  FOR i := 1 TO n - 1 DO
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
    bnd.east := FIRST(INTEGER);
    bnd.north := LAST(INTEGER);
    bnd.south := FIRST(INTEGER);
    FOR i := first TO last DO
      WITH pt = strk.pts[i] DO
        bnd.west := MIN(bnd.west, pt.h);
        bnd.east := MAX(bnd.east, pt.h);
        bnd.north := MIN(bnd.north, pt.v);
        bnd.south := MAX(bnd.south, pt.v);
      END;
    END;
  END Bound;

PROCEDURE SimpleTrim (VAR strk: Stroke) =
  BEGIN
    strk.start := 2;
    strk.stop := NUMBER(strk.pts^) - 3;
  END SimpleTrim;

PROCEDURE NoTrim (VAR strk: Stroke) =
  BEGIN
    strk.start := 0;
    strk.stop := NUMBER(strk.pts^) - 1;
  END NoTrim;

VAR
  oneCnt: INTEGER;
  n     : INTEGER;

BEGIN
  oneCnt := 0;
  n := NUMBER(strk.pts^);
  FOR i := 1 TO n - 1 DO
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
    IF PointDist(strk.pts[i - 1], strk.pts[i]) = 1 THEN INC(oneCnt); END;
  END;
  strk.oneFrac := FLOAT(oneCnt) / FLOAT(n);

IF Option.SimpleTrim IN options THEN
    SimpleTrim(strk);
  ELSIF Option.DontTrim IN options OR Option.Liveboard IN options THEN
    NoTrim(strk);
  ELSE
    Trim(strk);
  END;
  Bound(strk.bound, strk.start, strk.stop);
  Bound(strk.trueBound, 0, n - 1);
  strk.duration := strk.times[LAST(strk.times^)] - strk.times[0];
  Slope(strk); (* fill in slopes, slopeAv, slopeVar *)
  Recog(strk, options);
 END ComputeData;

VAR strokeBuf: ARRAY [0..Nstrokes] OF Stroke; (* XX: avoid stack overflow *)

PROCEDURE FromFile (rd: Rd.T; options := NoOptions): REF ARRAY OF Stroke =

PROCEDURE Bad() =
  BEGIN
    Put("Bad input file\n");
    Cstdlib.exit(1);
  END Bad;

VAR
    ch                  : CHAR;
    n                   : INTEGER;
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
  arr                 : ARRAY [0..100] OF CHAR;
  used, totUsed       : INTEGER;
  strokeCnt, pointCnt : INTEGER;
  ptBuf               : ARRAY [0..Npts] OF Point.T;
  timeBuf             : ARRAY [0..Npts] OF CARDINAL;
  (* strokeBuf: ARRAY [0..Nstrokes] OF Stroke; (* XX: should be list *) *)
  result: REF ARRAY OF Stroke;
<* FATAL Rd.Failure, Rd.EndOfFile, Thread.Alerted *>
BEGIN
  ch := Rd.GetChar(rd);
  IF ch # '@' THEN Bad(); END;
  ch := Rd.GetChar(rd);
  IF ch # '~' THEN Bad(); END;
  ch := Rd.GetChar(rd);
  IF ch # ' ' THEN Bad(); END;
  ch := Rd.GetChar(rd);
  IF ch # Version THEN Bad(); END;
  EVAL Rd.GetLine(rd);
  strokeCnt := -1;
  LOOP
    n := Rd.GetSubLine(rd, arr);
    IF n = 0 THEN EXIT END;
    IF n = 1 THEN
      IF strokeCnt >= 0 THEN
        strokeBuf[strokeCnt] := FromPts(SUBARRAY(ptBuf, 0, pointCnt),
                                SUBARRAY(timeBuf, 0, pointCnt), ch, options);
      END;
      pointCnt := 0;
      INC(strokeCnt);
      n := Rd.GetSubLine(rd, arr);
      IF n # 2 THEN Put("expected a single char\n");END;
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
        ch := arr[0];
        (* if out files are concentenated, then extra @ lines will be inserted *)
      ELSIF arr[0] # '@' THEN
        n := Convert.ToInt(arr, totUsed);
        ptBuf[pointCnt].h := n;
        n := Convert.ToInt(SUBARRAY(arr, totUsed+1, LAST(INTEGER)), used);
        INC(totUsed, used+1);
        ptBuf[pointCnt].v := n;
        n := Convert.ToUnsigned(SUBARRAY(arr, totUsed+1, LAST(INTEGER)), used);
        timeBuf[pointCnt] := n;
        INC(pointCnt); (* XXX: if overflow, alloc larger buffer *)
      END;
    END;
    strokeBuf[strokeCnt] := FromPts(SUBARRAY(ptBuf, 0, pointCnt),
                SUBARRAY(timeBuf, 0, pointCnt), ch, options);
    INC(strokeCnt);
    result := NEW(REF ARRAY OF Stroke, strokeCnt);
    result^ := SUBARRAY(strokeBuf, 0, strokeCnt);
    RETURN(result);
  END FromFile;

PROCEDURE ToFile(READONLY strks: ARRAY OF Stroke; wr: Wr.T)
  RAISES {Wr.Failure, Thread.Alerted} =
  VAR ch: CHAR;
  BEGIN
    Wr.PutText(wr, Fmt.F("@~ %s\n", Fmt.Char(Version)));
    FOR i := 0 TO NUMBER(strks)-1 DO
      WITH strk = strks[i] DO
        IF strk.ch = VAL(0, CHAR) THEN ch := '@' ELSE ch := strk.ch; END;
        Wr.PutText(wr, Fmt.F("\n%s\n", Fmt.Char(ch)));
        FOR j := 0 TO NUMBER(strk.pts^) - 1 DO
```

UNITED STATES PATENT AND TRADEMARK OFFICE
CERTIFICATE OF CORRECTION

PATENT NO.     : 5,596,656

DATED          : January 21, 1997

INVENTOR(S)    : David Goldberg

It is certified that error appears in the above-identified patent and that said Letters Patent is hereby corrected as shown below:

(continued from previous page)

```
       Wr.PutText(wr, Fmt.F("%s %s %s\n", Fmt.Int(strk.pts[j].h),
                        Fmt.Int(strk.pts[j].v), Fmt.Int(strk.times[j])));
      END;
     END;
    END;
  END ToFile;

PROCEDURE FromPts(READONLY pts: ARRAY OF Point.T;
                  READONLY times: ARRAY OF CARDINAL := ARRAY [0..-1] OF
                                                           CARDINAL{};
                  ch       : CHAR := Unknown;
                  options  := NoOptions)           : Stroke =
  VAR stroke: Stroke;
  BEGIN
    stroke.ch := ch;
    stroke.pts := NEW(REF ARRAY OF Point.T, NUMBER (pts));
    stroke.pts^ := pts;
    IF NUMBER(times) > 0 THEN
      stroke.times := NEW(REF ARRAY OF CARDINAL, NUMBER (pts));
      stroke.times^ := times;
    ELSE
      stroke.times := NIL;
    END;
    ComputeData(stroke, options);
    RETURN(stroke);
  END FromPts;

PROCEDURE TimeToInt(tm: Time.T; init := -1): CARDINAL =
  VAR val: INTEGER;
  BEGIN
    (* reduce secs mod N, with N such that N*1000 fits into an integer *)
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

```
  tm.seconds := Word.And(tm.seconds, 16_1fffff);
  val := ROUND(0.001D0*(1000000.0D0*FLOAT(tm.seconds, LONGREAL)
                        + FLOAT(tm.microseconds, LONGREAL)));
  IF init = -1 THEN RETURN (val - defaultInit); ELSE RETURN (val - init); END;
  END TimeToInt;

VAR defaultInit: INTEGER;
PROCEDURE Main () =
  VAR rd: Rd.T;
  BEGIN
    TRY
      rd := FileStream.OpenRead("rectable.txt");
    EXCEPT
      Rd.Failure =>
        TRY
          rd := RecogBundle.GetBundle().open("recog")
        EXCEPT
          Bundle.NotFound => Put("Can't open rectable.txt\n"); Cstdlib.exit(1);
        END;
    END;
    ReadTable(rd);
    defaultInit := TimeToInt(Time.Now(), init := 0);
    InitSlopeTable();
  END Main;

BEGIN
  Main();
END Recog.
```

UNITED STATES PATENT AND TRADEMARK OFFICE
CERTIFICATE OF CORRECTION

PATENT NO. : 5,596,656

DATED : January 21, 1997

INVENTOR(S) : David Goldberg

It is certified that error appears in the above-identified patent and that said Letters Patent is hereby corrected as shown below:

(continued from previous page)

Column 7, line 18, after "component" insert --,-- (a comma); column 7, line 20, after "independent of" insert --and--; column 7, line 27, change "convening" to --converting--; column 7, line 37, change "interlace" to --interface--.

Signed and Sealed this

Tenth Day of February, 1998

*Attest:*

BRUCE LEHMAN

*Attesting Officer*   *Commissioner of Patents and Trademarks*

/

REEXAMINATION CERTIFICATE (4062nd)

United States Patent [19]
Goldberg

[11] B1 5,596,656
[45] Certificate Issued Apr. 25, 2000

[54] UNISTROKES FOR COMPUTERIZED INTERPRETATION OF HANDWRITING

[75] Inventor: David Goldberg, Palo Alto, Calif.

[73] Assignee: Xerox Corporation, Stamford, Conn.

Reexamination Requests:
No. 90/005,153, Oct. 21, 1998
No. 90/005,403, Jun. 23, 1999

Reexamination Certificate for:
Patent No.: 5,596,656
Issued: Jan. 21, 1997
Appl. No.: 08/548,416
Filed: Oct. 26, 1995

Certificate of Correction issued Feb. 10, 1998.

Related U.S. Application Data

[63] Continuation of application No. 08/132,401, Oct. 6, 1993, abandoned.

[51] Int. Cl.[7] ............................................. G06K 9/18
[52] U.S. Cl. .......................... 382/186; 382/315; 345/179
[58] Field of Search ................................... 382/185–189, 382/313, 315, 182; 345/179

[56] References Cited

U.S. PATENT DOCUMENTS

| | | | |
|---|---|---|---|
| 3,903,502 | 9/1975 | Moss | 382/188 |
| 4,139,837 | 2/1979 | Lijenwall et al. | 382/189 |
| 4,718,102 | 1/1988 | Crane et al. | 382/185 |
| 4,972,496 | 11/1990 | Sklarew | 382/187 |
| 4,985,929 | 1/1991 | Tsuyama | 704/235 |
| 5,034,989 | 7/1991 | Loh | 382/189 |
| 5,140,645 | 8/1992 | Whitaker | 382/184 |
| 5,214,428 | 5/1993 | Allen | 382/313 |

FOREIGN PATENT DOCUMENTS 59-35277  2/1984  Japan .

OTHER PUBLICATIONS

PenRight! Application User's Guide, 1992.
Tappert et al., "The State of the Art in On–Line Handwriting Recognition", Aug. 1990.
Burr, D.J. "Designing a Handwriting Reader", IEEE DDX 69, 1983.
Ward et al., "Interactive Recognition of Handprinted Characters for Computer Input", IEEE CG&A, 1985.
Goldberg et al., "Touch Typing with a Stylus", ACM, May 1993.
Graffiti Reference Card—date of publication unknown.
Moon Type Alphabet, 1986.
Stenographie Alphabet, 1934.
Sklarew, "Death of a Keyboard" Best's Review—date unclear from copy.

*Primary Examiner*—Amelia Au

[57] ABSTRACT

To relax the graphical constraints on the precision of the handwriting that is required for accurate computerized interpretation of handwritten text, the text that is to be interpreted is written in accordance with this invention using symbols that are exceptionally well separated from each other graphically. These symbols preferably define an orthographic alphabet to reduce the time and effort that is required to learn to write text with them at an acceptably high rate. Furthermore, to accommodate "eyes-free" writing of text and the writing of text in spatially constrained text entry fields, the symbols advantageously are defined by unistrokes (as used herein, a "unistroke" is a single, unbroken stroke).

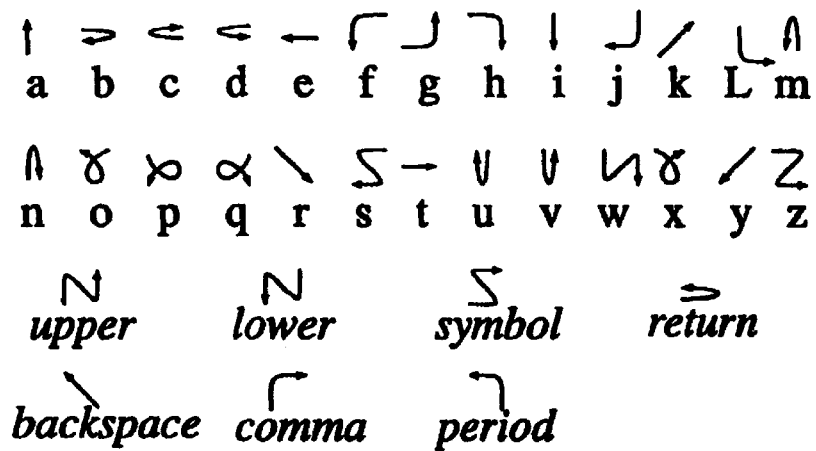

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–16 is confirmed.

\* \* \* \* \*